United States Patent [19]

Boeckmann

[11] Patent Number: 4,844,759
[45] Date of Patent: Jul. 4, 1989

[54] METHOD OF AND MEANS FOR APPLYING RECLOSABLE FASTENERS TO PLASTIC FILM

[75] Inventor: Hugo Boeckmann, Arlington Heights, Ill.

[73] Assignee: Minigrip, Inc., Orangeburg, N.Y.

[21] Appl. No.: 194,524

[22] Filed: May 13, 1988

[51] Int. Cl.⁴ .............................................. B29D 5/00
[52] U.S. Cl. ....................................... 156/66; 383/63; 493/927
[58] Field of Search .................. 156/66, 517, 519, 581; 383/63, 65, 95, 97; 493/213, 214, 927

[56] References Cited

U.S. PATENT DOCUMENTS

| 3,988,184 | 10/1976 | Howard | 156/162 |
| 4,528,224 | 7/1985 | Ausnit | 383/97 |
| 4,532,652 | 7/1985 | Herrington | 383/63 |
| 4,655,862 | 4/1987 | Christoff et al. | 156/66 |
| 4,736,450 | 4/1988 | Van Erden et al. | 156/66 |

Primary Examiner—Michael W. Ball
Assistant Examiner—Gregory J. Wilber
Attorney, Agent, or Firm—Hill, Van Santen, Steadman & Simpson

[57] ABSTRACT

A method and apparatus for making reclosable bag material wherein a film has a longitudinal formation axis extending the length of a bag to be made therefrom and the film is incrementally advanced longitudinally, strips of extruded plastic profiled reclosable fastener strip are movable laterally axially across the film for location at one end of a bag made from the film with the profiles projecting in a direction toward the film, the strip is rotated to have the profiles facing away from the film and a strip base placed on the film and the base heat bonded to the film.

24 Claims, 3 Drawing Sheets

METHOD OF AND MEANS FOR APPLYING RECLOSABLE FASTENERS TO PLASTIC FILM

BACKGROUND OF THE INVENTION

The invention relates to the art of making reclosable bags, the material for making such bags, and method and means for making the same and is particularly concerned with bags formed of flexible plastic film with an extruded resiliently flexible plastic profiled reclosable separable fastener at the bag top.

The art of making reclosable bags equipped with extruded plastic profiled reclosable fasteners has seen a long period of development as reflected in numerous patent disclosures. It has been conventional practice to extrude plastic film in tubular form with the profiled separable fastener means coextruded along with and parallel to the longitudinal formation axis of the tubular film, that is, the direction in which the tube is extruded. On the other hand, prefabricated separable fastener profile strips have been secured to film. Generally, the film is in a continuous sheet and to form a bag, the film is doubled onto itself with the folded edge forming the bottom of a series of bags. In this arrangement, the fastener profiles extend in the longitudinal axis direction of the continuous film sheet.

By way of example, U.S. Pat. No. Re. 29,043 is referred to as disclosing coextrusion of web and fastener means and forming the same into bag sections.

U.S. Pat. No. 3,948,705 exemplifies the technique of securing reclosable separable fastener strips to plastic film parallel to the longitudinal formation axis of the web by fusion or heat seal methods.

Attachment of separable fastener strips parallel to the longitudinal formation axis of the web by adhesive means is exemplified in U.S. Pat. No. 4,372,793; 4,354,541; and 4,355,494.

U.S. Pat. No. 4,046,408 discloses separably interlockable fasteners along the edges of the plastic sheet material having generally arrow shaped profiles, the fasteners being either integrally extruded with flat sheets or tubes of plastic film, or supplied in the form of extruded strips attached to the web or film by heat sealing.

It has been recognized, however, in the disclosure of U.S. Pat. No. 4,655,862 that advantages accrue in a method and apparatus for making bag material by forming the material by securing to the film of the material an extruded plastic profile reclosable fastener strip lengthwise across the material and at right angles to the formation axis of the film.

According to the above prior art disclosures, with the exception of U.S. Pat. No. 4,655,862, it is necessary to provide a pair of longitudinally extending complementary profile fastener strips along the longitudinal extent of the bag material. When the material is folded upon itself, the fastener profiles will be brought together in face-to-face relationship and aligned with one another. The strips are aligned in interlockable relation with the ribs facing the grooves. The fastener strips extend along the top or bag mouth edges of the bag sections. When the bag material is folded laterally to bring the fastener strips together, the folded bag material is sealed crosswise at spaced intervals to form separate bags.

In another method of forming bags, separate strips of the web of film material each carrying the complementary profile fastener strips are laid on top of each other to provide bag sidewalls. The side and bottom edges of the bag walls must be seamed together to complete the bags.

Those prior techniques do not necessarily limit the length of bags to be produced thereby, that is, the length from the bag top end to the bottom end of the bag, unless the bags are supplied for filling by the type of filling machines commonly referred to as form, fill and seal machines, such as exemplified in U.S. Pat. No. 4,355,494.

Where the fastener strip means are located longitudinally along the length of the bag making web material, the length of the bags that can be produced in the form, fill and seal machines is limited to the diameter of the filling nozzle about which the film or web material is progressively wrapped. Further, unless the fastener profiles are interlocked before the bag forming material is wrapped about the forming extent of the filling nozzle or at least before the usual longitudinal sealing of the joined longitudinal edges or margins of the bag forming material, there is a considerable problem with attaining interlockable registration of the fastener profiles.

Furthermore, if and when used on vertical form, fill, and seal apparatus, bag material as shown in U.S. Pat. No. 4,355,494 has certain shortcomings, as the material will produce finished bags having reclosable fastener means running in the longitudinal formation direction of the material and, thus, in a vertical direction along the bags. Such bags may not be commercially acceptable for some products, e,g., some types of candies, potato chips, and other snack foods.

SUMMARY OF THE PRESENT INVENTION

In accordance with the present invention, the problems, disadvantages and shortcomings inherent in prior techniques where the fastener was run parallel to the longitudinal formation axis of the film are avoided. Also, disadvantages and problems still encountered in the formation of bag film in accordance with U.S. Pat. No. 4,655,862 are avoided.

An important object of the present invention is to provide a new and improved method of making bag material attaching a profiled fastener strip across the bag film at right angles to the longitudinal formation axis of the web material.

A further object of the invention is to provide a new and improved method of making bags with reclosable plastic fastener means.

A further object of the invention is to provide a new and improved method of and apparatus for making material adapted for making of reclosable bags, attaching profiled fastener strips extending laterally of the longitudinal formation axis of the web material where the process and apparatus can operate in an improved fashion to make bag material at relatively high production speeds.

In accordance with the principles of the present invention, an extruded plastic profiled reclosable fastener strip is carried laterally axially across a film at right angles to the longitudinal formation axis of the film wherein the strip has profiles of a nature which have the capability of attachment to itself. That is, the fastener strip has profiles which have a series of ribs and grooves wherein each is shaped so that the ribs can enter into the grooves and the strip can be doubled upon itself to form a bag closure. The strip is advanced across the film with the profiles first projecting toward the film and then the strip is rotated about an axis at right angles to the formation axis of the film so that the profiles project outwardly away from the film. The base of the strip has webs which are located on the film and the webs are heat bonded to the film. With controlled bonding, half of the fastener strip is attached to the film with the top edge of the web only secured so that the strip has a hinged relationship to the film. When the film is doubled to form the bag, the hinged portion provides a flexible joint so that the walls of the bag can be pushed outwardly and the stresses on the profiled fastener are in the shear mode rather than the peel mode. Yet, when the bag is to be opened, pull flanges which extend above the fastener strip can be pulled about to peel open the fasteners for ready access to the interior of the bag.

Other objects, advantages and features will become more apparent with the teaching of the principles of the invention in connection with the disclosure of the preferred embodiments in the specification, claims and drawings, in which:

DESCRIPTION OF THE PREFERRED EMBODIMENTS

Figure 1:
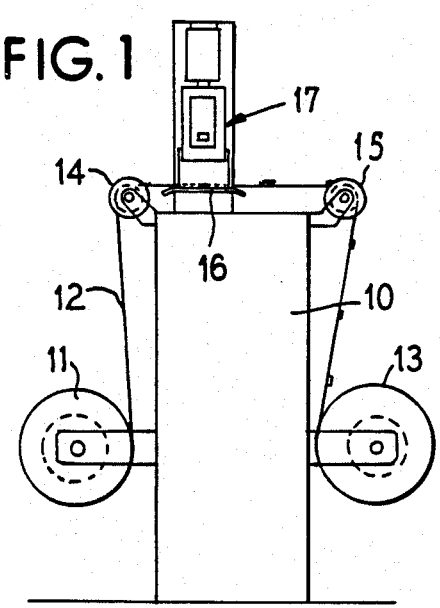
FIG. 1 is a somewhat schematic front elevational view of an apparatus constructed and operating in accordance with the principles of the present invention.

FIGS. 1 through 5 illustrate a preferred form of mechanism for the attachment of fastener strips in accordance with the method concepts of the invention. As illustrated in FIG. 1, the mechanism is supported on a stand 10 which holds a supply roll 11 of thin plastic bag film 12. After cross fastener strips are positioned and secured to the film, it is rolled up onto a receiving roll 13.

The film 12 which receives fastener strips is drawn across a support table 16 guided by rolls 14 and 15. An operating head 17, shown in more detail in FIGS. 2 through 5, moves an extruded plastic profile reclosable fastener strip laterally axially across the film. The film is moved forward in an axial direction with its direction of movement coinciding with a longitudinal formation axis. In other words, the vertical axis of the bag extending from the bottom to the top extends in the direction of movement of the film 12.

Figure 2:
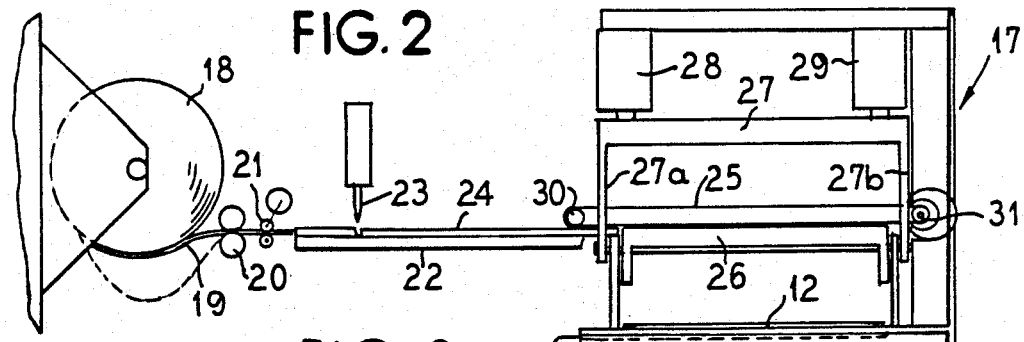
FIG. 2 is a side elevational view of a portion of the mechanism of FIG. 1.
Figure 3:
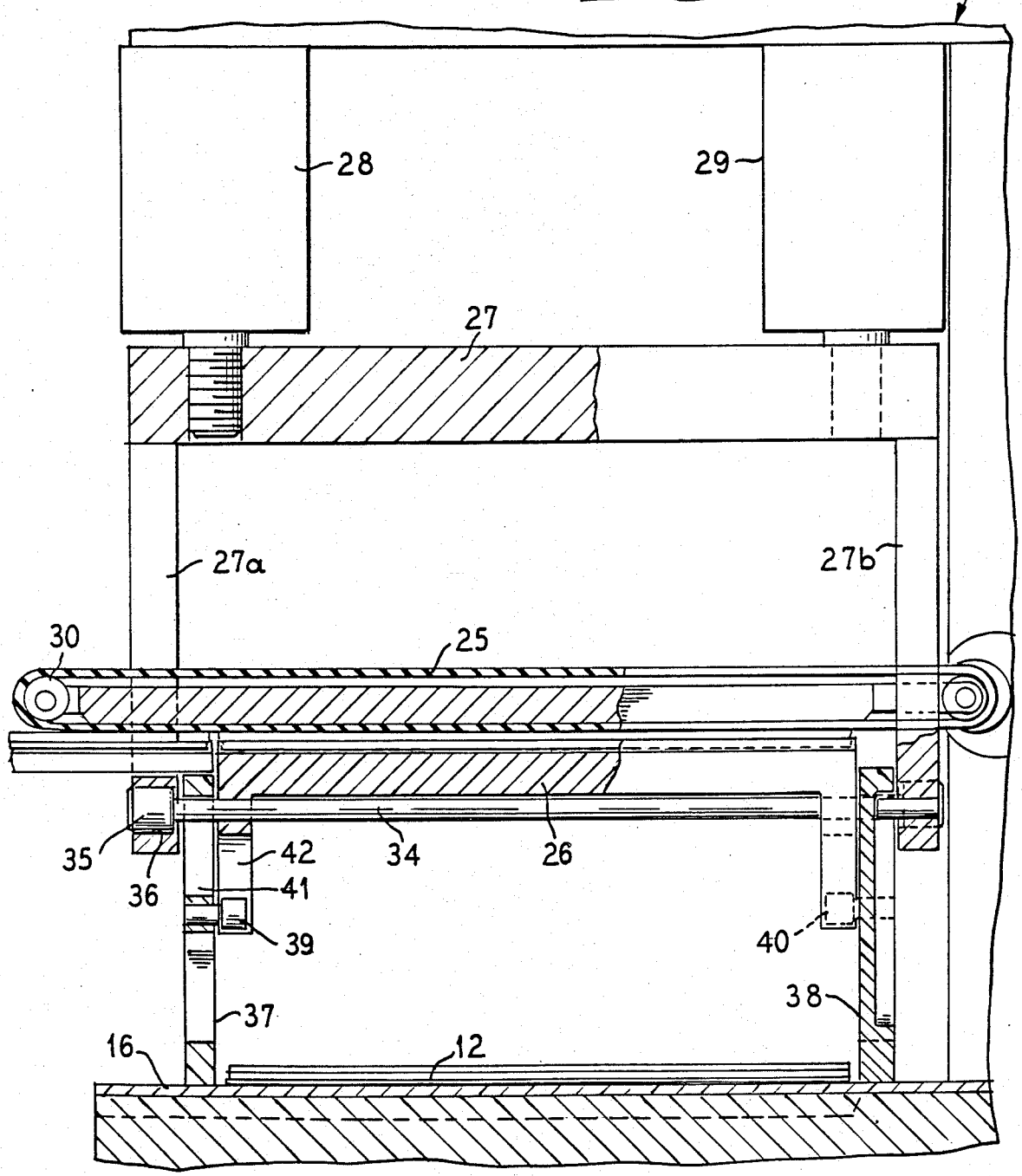
FIG. 3 is an enlarged fragmentary view with portions broken away illustrating details of the apparatus of FIG. 1.

As illustrated in FIG. 2, the film is moving in a direction into the Figure which is the direction of the longitudinal formation axis of the film. A supply roll of an extruded plastic profile fastener strip is shown at 18 with a supply strip 19 being fed off between guide rolls 20 and pulled forwardly by driven pull rolls 21. A supply length of fastener strip 24 is moved across a table 22 in position to be moved over the top of the next length of film which is advanced over the table 16. The supply strip 24 is of the same length as the width of the film. This supply length 24 is cut off by a knife 23. The lead end of the profile strip is received under the end of a delivery belt 25. The delivery belt is driven incrementally supported on belt rolls 30 and 31.

When a length of film has been advanced in the longitudinal formation axis direction, a length of extruded plastic strip is movable laterally axially of the strip across the film. The amount the film is advanced determines the length of the bag and thus locates where the fastener strip is to be attached.

The strip has interlocking profiles thereon with a base web for supporting the profiles and for attachment to the film.

Figure 5:
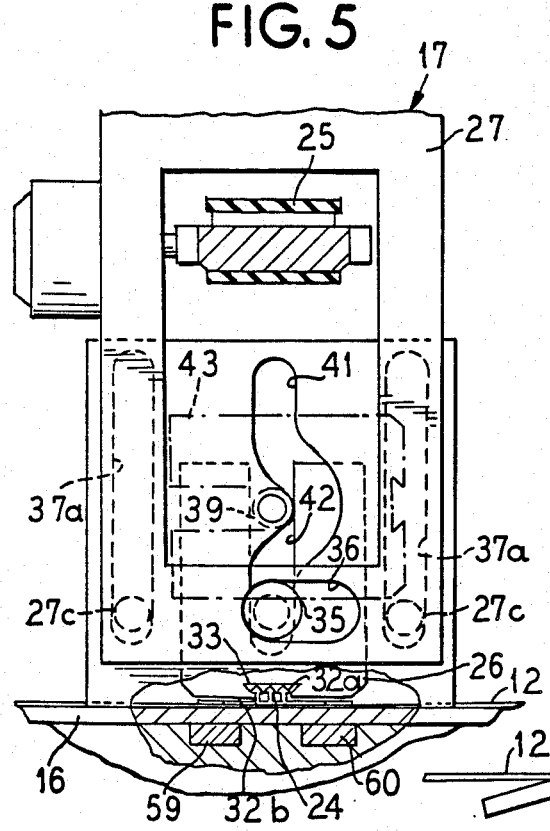
FIG. 5 is a detailed fragmentary view of a portion of FIG. 4, which is somewhat enlarged, to illustrate change in position with movement of the part.
Figure 4:
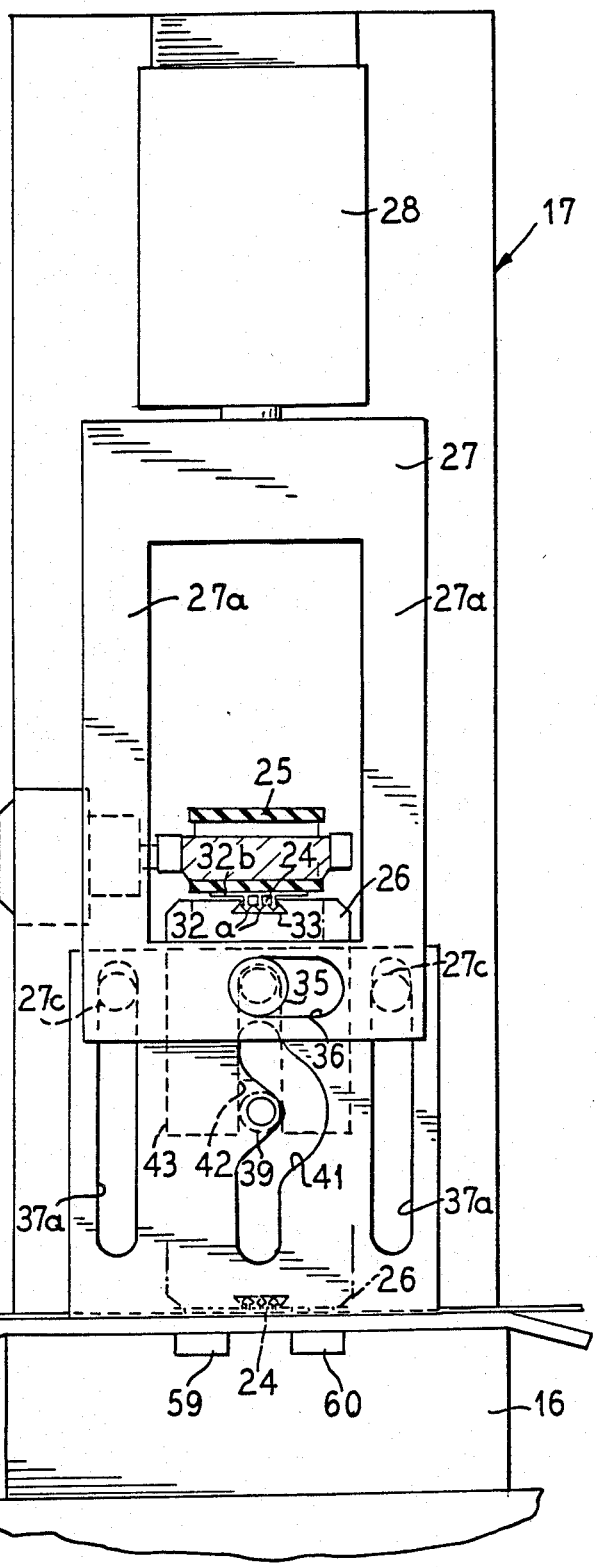
FIG. 4 is an end elevational view of the apparatus of FIG. 3.

In a preferred form, the fastener strip has profiles shaped so that the strip can attach to itself, and as illustrated in FIGS. 4 and 5, the strip has ribs or heads 32a thereon with grooves therebetween, projecting from a support base 32b which has webs projecting from the sides of the strip. Either the whole web can be attached to the film or the web be attached at one side of the profile so that the remainder of the strip is hinged to the film for improved strength in resisting inadvertent opening of the finished bag. The strip is so constructed with a plurality of heads which are shown as arrow-shaped with intermediate grooves so that when the strip is doubled on itself, the heads will fit in the grooves and the strip is, therefore, capable of attaching to itself. Various modifications of such a strip are disclosed to art and will be recognized by those who are versed in the rib and groove shaped profile art.

The fastener strip 24 is delivered across a carrier head 26. The carrier head has a strip supporting groove 33 in its upper table surface. The belt 25 drags the strip 24 across the top of the table of the head 26 in the groove 33, FIG. 4. For this purpose, the belt 25 has a frictional surface so that it will readily slide the strip 24 across onto the head which locates it above the film 12.

The head 26 is then carried downwardly and rotated through 180° about an axis transverse of the formation axis of the film. While the strip 24 is initially in the groove in an upside down position, that is, with the web 32b upwardly and the heads 32a downwardly, the rotation of the head 26 will carry the strip to its upright position to position it on the film in the location shown in FIG. 5.

To move the head 26 downwardly and rotate it about its transverse axis, the head is carried on a yoke 27 having side legs 27a and 27b attached to the head 26. The yoke 27 has at its ends pneumatic cylinders 28 and 29 which are used to force the yoke 27 downwardly to thereby carry the head 26 downwardly and rotate the strip and locate it onto the film.

When the strip is in place in the groove on the head 26, the cylinders 28 and 29 force the yoke 27 downwardly. The result of this movement can be best viewed in connection with FIGS. 3 through 5. The ends 27a and 27b of the yoke are connected to the head by a cross shaft 34. The cross shaft rotates in and supports the head 26. As the yoke moves downwardly, it carries the cross shaft 34 downwardly and thus the head 26 starts to move downwardly. The cross shaft 34 is connected to the ends of the yoke by rollers such as 35 at its ends in horizontal slots 30 in the yoke ends.

The shaft 34 passes through a cam slot 41 in uprights 37 and 38 which are supported on the frame 10 and which are at the sides of the film 12. The slots control the path of the shaft 34 when the yoke descends so as to flip over the head 26 to the upside down position from the position shown in FIG. 4 to the position shown in FIG. 5. Swinging the head about an axis which is parallel to the longitudinal formation axis of the film turns the strip 24 from an upside down position to an upright position placing it onto the film, carrying it from the position of FIG. 4 to the position of FIG. 5. The slot 36 in the yoke allows for sideways movement of the shaft 34 as the head is rotating. The position of the head is also controlled by a roller boss 39 and 40 which is fixed on the uprights 37 and 38 and which extends into a vertical slot 42 in the ends of the head.

The yoke 27 is guided in its downward movement to insure that it travels vertically by pins 27c which slide in vertical slots 37a in the uprights 37 and 38.

When the head 26 has positioned the strip on the film 12, the strip is bonded to the film by heating bars 59 and 60 which transmit heat to the lower surface of the film to cause the thermoplastic of the film to bond to the thermoplastic of the web of the strip. In some bags, it may be desirable to attach the full width of the web of the strip to the film. In other structures, it may be desirable to selectively attach only a portion of the web to the film in order to create a hinge support for the strip on the film. This hinge support which will be achieved by a connection above the profiles permits the fasteners at the top of the bag to be hinged to at least one of the side panels of the bag so that the fastener is stressed in shear stress rather than peel stress and this greatly enhances the strength of the fastener in keeping the bag closed in that it is not easily forced open due to stresses from the bag walls. Yet, by pulling apart on the pull flanges at the top of the bag, it readily opens.

The selective attachment of the strips to the film of the wall panels is illustrated in connection with FIGS. 9 through 13.

Figure 6:
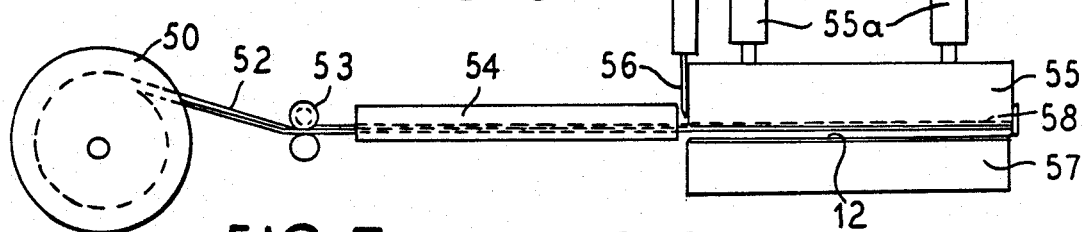
FIG. 6 is a somewhat schematic elevational view illustrating mechanism of a different construction operating in accordance with the principles of the present invention.

Another form of simplified mechanism for attaching strips across the film is shown in FIG. 6. In FIG. 6 a fastener strip is supplied from a roll 50 with the strip shown at 52 and advanced between advancing rolls 53. The strip is advanced across a support table 54 into a slot 58 in a head 55. In this instance, the head is arranged so that the strip is upright with its profiles facing upwardly and the base attachment web facing downwardly for attachment to the film. A length of strip is advanced into the groove 58 in the head 55 and a knife 56 cuts off the proper length. The head is then lowered by pneumatic cylinders 55a to position the strip onto the film. Suitable heaters then heat bond the strip to the film.

Figure 7:
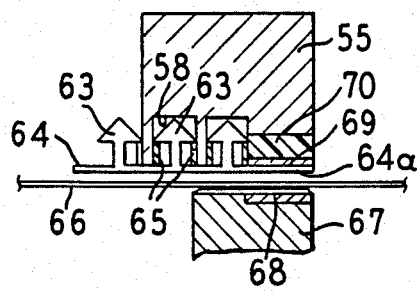
FIG. 7 is an enlarged fragmentary elevational view, partly in section, illustrating the position of the fastener strip relative to its supporting apparatus.

An end view of the head of FIG. 6 is shown in FIG. 7 and the head is provided with means for supporting the strip so that it will not fall out of the slots.

As illustrated in FIG. 7, a plurality of slots are provided to receive the multiple heads 63 of the fastener strip. The strip has a base web with webs 64 and 64a at each side of the heads 63. The film is shown at 66. At the sides of the slots are plastic retainer strips 65 which temporarily lock between the shoulders of the heads 63 to hold the strip in place and keep it from falling downwardly while it is being pushed across the head 55. With this guidance, the strip has sufficient beam strength to travel across the full width of the head 55.

When the head 55 is lowered to press the strip down onto the film 66, a heating element 68 in a film supporting table 67 transmits heat to the film to heat bond the web 64a to the film. The web is supported by a layer of Teflon 69 backed by a soft resilient material such as sponge heat resistant rubber 70. With this arrangement, only the web portion 64a above the profiles 63 is attached to the film. This will create the resultant bond between the bag and the closure strips shown in FIG. 9.

Figure 8:
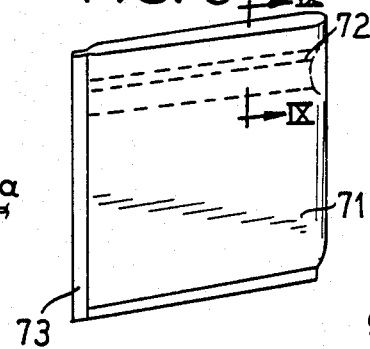
FIG. 8 is a perspective view of a bag fabricated in accordance with the method.
Figure 10:
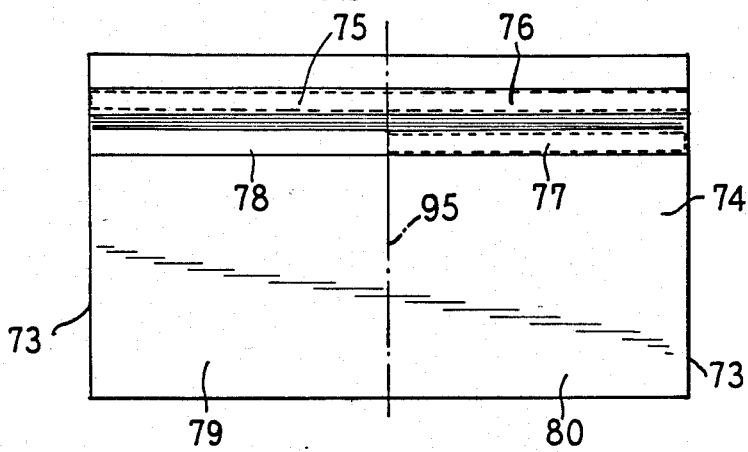
FIG. 10 is a plan view of the film for a single bag illustrating the manner of attaching the fastener strip.
Figure 12:
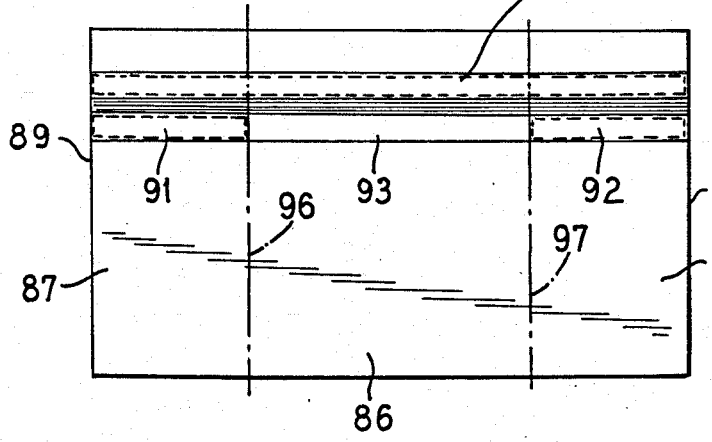
FIG. 12 is a plan view similar to FIG. 10 illustrating another manner in which the fastener strips are bonded to the film.

By attaching a separate fastener strip across the longitudinal axis of a continuous length of film, the film can be folded in folds parallel to the longitudinal axis. FIGS. 8 and 10 show one location for the fold and FIG. 12 shows a different location.

FIG. 8 illustrates a bag which is formed when the film is doubled bringing edges 73 together folding the middle about the longitudinal axis of the film forming a bag 71 with fastener strips 72 forming a closure for the top of the bag.

Figure 9:
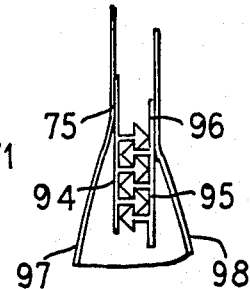
FIG. 9 is an enlarged fragmentary sectional view taken substantially along line IX—IX of FIG. 8.

As will be observed in FIG. 9, film side panels 97 and 98 have the fastener strips 94 and 95 attached at the top of the bag. The strip 94 is bonded only by the web 75 to the side wall film. In the arrangement of FIG. 9, both strips are hinged to the side wall and the strip 95 is attached only at its web portion 96.

Figure 11:
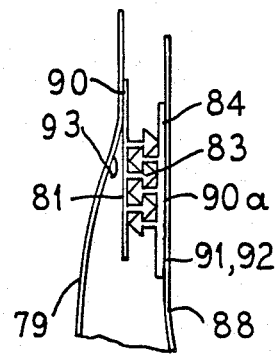
FIG. 11 is a fragmentary sectional view, similar to FIG. 9, but illustrating another manner in which the fastener strips are bonded to the film.

In the arrangement of FIGS. 10 and 11, one of the strips 81 is hingedly attached to its side panel 79 whereas the other strip 83 is attached over its entire base. Strip 81 is attached by its web portion at 90, whereas strip 90a is attached over its entire web portion base 84. This leaves the strip 81 unattached in the area 93.

Folding is accomplished as shown by laid-out film 74 in FIG. 10. To form the bag, the edges 73 are brought together folding the film 74 down its center 95. The webs of the fastener strips are shown with the upper portion of the webs attached at 75 and 76 and the lower portion attached only at 77 with the area 78 remaining unattached. Thus, when the bag is folded about its centerline 95 to double the fastener strip and bring the halves together, the strip on one panel of the bag will be attached both above and below the profiles. The strip on the other panel of the bag will be hinged, being attached only above its profile.

Figure 13:
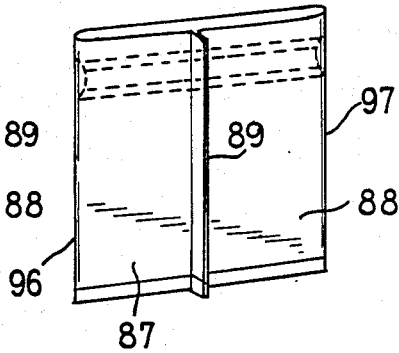
FIG. 13 is a perspective view illustrating another way in which the bag can be fabricated from the film.

This arrangement can also be accomplished wherein the bag is formed with fold lines spaced one-fourth way in from the side as shown by the fold lines 96 and 97 in FIG. 12. The edges 89 are brought together to form a seam such as shown in FIG. 13 forming a bag 88. The rear panel will comprise the area 86. The fastener strip which extends across the film is attached by its upper web in the area 90 over the full width of the film. The lower portion of the web is attached only at the one-fourth ends at 91 and 92 whereas the middle one-half at 93 remains unattached. When the bag is folded in the manner shown in FIG. 13 so that the profiles of the strip interlock, at one side at the bag at one panel, the strip will be attached only above the profile whereas at the other side of the bag, the strip will be attached both above and below the profile.

Thus, it will be seen that there has been provided an improved method and apparatus for making bag material which meets the objectives and advantages above set forth and which is readily adaptable to high speed commercial manufacture. The reliable manufacture of bag material is accomplished utilizing the method of advancing and fastening the strip cross-wise of the longitudinal formation axis of the bag material.

I claim as my invention:

1. A method of making reclosable bag material comprising the steps:
   providing a film having a longitudinal formation axis;
   moving an extruded plastic profiled reclosable fastener strip laterally axially across the film into a carrier head for location at one end of a bag made from said film with profiles projecting in a direction toward the film, said strip having profiles and a supporting web for attachment to the film;
   moving said carrier head and strip toward the film normal to the surface of the film while simultaneously rotating said carrier head and profile strip about an axis transverse of said formation axis and locating the strip on the film, said carrier head being carried on a support which moves in a linear path toward said film while said carrier head is simultaneously rotated; and
   bonding the strip to the film with the profiles facing away from said film.

2. A method of making reclosable bag material in accordance with the steps of claim 1:
   wherein the fastener strip is pulled axially across the film.

3. A method of making reclosable bag material in accordance with the steps of claim 1:
   including applying heat to the film and strip for the bonding step.

4. A method of making reclosable bag material in accordance with the steps of claim 3:
   wherein heat is applied to the film at the surface opposite the strip.

5. A method of making reclosable bag material in accordance with the steps of claim 1:
   wherein said supporting web projects laterally from both sides of the profile and only a portion of said web is bonded to the film.

6. A method of making reclosable bag material in accordance with the steps of claim 5:
   wherein at the location of one panel of a bag made from said film the web is bonded at a location only above the profile.

7. A method of making reclosable bag material in accordance with the steps of claim 1:
   wherein the web is bonded over its full area at the location of one panel of a bag made from the film and is bonded only along the top edge for the other panel.

8. A method of making reclosable bag material in accordance with the steps of claim 1:
   wherein the supporting web extends above and below the profile and the web is bonded to the film at a location below the profile for a portion of the width of the film.

9. A method of making reclosable bag material in accordance with the steps of claim 8:
   wherein the web is bonded below the profile to the film over one half of the width of the film and a bond between the web and film extends over the full width of the web above the profile.

10. A method of making reclosable bag material in accordance with the steps of claim 9:
    wherein the bonding below the profile extends one quarter of the width of the film from each side of the film so that the total bonding is one half the film width below the profile.

11. A method of making reclosable bag material in accordance with the steps of claim 8:
    wherein the supporting web is bonded over its entire area to the film.

12. A method of making reclosable bag material in accordance with the steps of claim 1:
    wherein the fastener is attached to the film both above and below the profile and the bonding below the profile extends for one-half of the length of the fastener.

13. A method of making reclosable bag material in accordance with the steps of claim 12:
    wherein the fastener strip is attached to the film only above the profile for the remaining one-half of the length of the strip.

14. A method of making reclosable bag material in accordance with the steps of claim 1:
    wherein the strip is moved while supported over its full length.

15. A mechanism for fabricating bag material comprising in combination:
    means for supporting a film having a longitudinal formation axis;
    means for moving an extruded plastic profiled reclosable fastener strip laterally axially across the film into a carrier head at a location at one end of a bag made from the film with profiles facing toward the film;
    said strip having profiles and a base web for attachment to the film; said carrier head mounted on a support;
    means moving said support in a linear path toward the film normal to the surface of the film;
    means for simultaneously rotating said carrier head and profiled strip about an axis transverse of said formation axis while moving said support in said linear path and locating the strip on the film; and
    means bonding the strip to the film with the profiles facing away from said film.

16. A mechanism for fabricating bag material constructed in accordance with claim 15:
    wherein said moving means is in the form of a traveling belt arranged for supporting and carrying the strip.

17. A mechanism for fabricating bag material constructed in accordance with claim 1:
    wherein said carrier head has an upwardly facing slot in which the strip is deposited.

18. A mechanism for fabricating bag material constructed in accordance with claim 17:
    including means for locking the strip in said slot.

19. A mechanism for fabricating bag material constructed in accordance with claim 15:
    including means for incrementally advancing the film for a bag width with each advancement for receiving another fastener strip.

20. A mechanism for fabricating bag material constructed in accordance with claim 15:
including means for providing an endless supply of fastener strip with a cutting means to sever individual lengths for application to the film.

21. A mechanism for fabricating bag material constructed in accordance with claim 15:
including a heating bar positioned for engagement with the film for bonding the strip to the film.

22. A mechanism for fabricating bag material constructed in accordance with claim 24:
wherein said heating bar is shaped so that only a portion of the film is heated opposite only a portion of the base web of the strip.

23. A mechanism for fabricating bag material constructed in accordance with claim 15:
wherein said bonding means includes a Teflon plate positioned above the strip web in supporting relationship thereto and a heating bar positioned for application to the film to bond the strip to the film.

24. A mechanism for fabricating bag material constructed in accordance with claim 23:
wherein said Teflon plate is supported on a resilient support.

* * * * *